(12) United States Patent
Ochiai et al.

(10) Patent No.: US 8,284,339 B2
(45) Date of Patent: Oct. 9, 2012

(54) LIQUID CRYSTAL DISPLAY DEVICE

(75) Inventors: Takahiro Ochiai, Chiba (JP); Tohru Sasaki, Mobara (JP); Tetsuya Nagata, Mobara (JP)

(73) Assignees: Hitachi Displays, Ltd., Chiba-ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 639 days.

(21) Appl. No.: 12/379,363

(22) Filed: Feb. 19, 2009

(65) Prior Publication Data

US 2009/0213290 A1 Aug. 27, 2009

(30) Foreign Application Priority Data

Feb. 26, 2008 (JP) ................................. 2008-044247

(51) Int. Cl.
*G02F 1/136* (2006.01)

(52) U.S. Cl. .............. 349/46; 349/155; 349/47; 349/48; 257/52; 257/57; 257/59

(58) Field of Classification Search .................... 348/46, 348/47, 48, 155; 257/52, 57, 59
See application file for complete search history.

(56) References Cited

U.S. PATENT DOCUMENTS

| 6,762,805 B2 * | 7/2004 | Ishino .............................. 349/46 |
| 6,921,917 B2 * | 7/2005 | Choi et al. ....................... 257/59 |
| 6,999,060 B2 * | 2/2006 | Choo ............................. 349/139 |
| 7,133,108 B2 * | 11/2006 | Shimizu et al. ................ 349/155 |
| 7,285,902 B2 * | 10/2007 | Koo et al. ....................... 313/500 |
| 7,349,038 B2 * | 3/2008 | Park et al. ........................ 349/43 |
| 7,352,429 B2 * | 4/2008 | Tseng et al. ................... 349/155 |
| 2007/0002219 A1 * | 1/2007 | Lee et al. ....................... 349/106 |
| 2008/0185589 A1 * | 8/2008 | Shin et al. ........................ 257/59 |
| 2009/0284695 A1 * | 11/2009 | Kim et al. ..................... 349/106 |

FOREIGN PATENT DOCUMENTS

JP 11-084386 9/1997

* cited by examiner

*Primary Examiner* — Edward Glick
*Assistant Examiner* — Sang Nguyen
(74) *Attorney, Agent, or Firm* — Stites & Harbison, PLLC; Juan Carlos A. Marquez, Esq

(57) ABSTRACT

A column for defining the interval between a TFT substrate and an opposed substrate is formed at a crossing point between a drain line and a scanning line. At the crossing point where the column is formed, the drain line is formed to have a wider width to prevent light leakage. Further, at the crossing point where the column is formed, the scanning line is formed to have a narrower width to prevent increase of capacitance between the drain line and the scanning line. The column is formed at a crossing point corresponding to a specific color, e.g., a blue pixel B, so that a difference in transmittance and in characteristic of thin film transistors due to formation of the column is initially compensated.

4 Claims, 6 Drawing Sheets

LIQUID CRYSTAL DISPLAY DEVICE

CROSS-REFERENCE TO RELATED APPLICATION

The present application claims priority from Japanese application JP2008-044247 filed on Feb. 26, 2008, the content of which is hereby incorporated by reference into this application.

BACKGROUND OF THE INVENTION

1. Field of the Invention

The present invention relates to a liquid crystal display device, and in particular to a technique for ensuring an appropriate interval between a TFT substrate and an opposed substrate, using a column-type spacer.

2. Description of the Related Art

In a liquid crystal display device, liquid crystal is filled between a TFT substrate with a pixel electrode and a thin film transistor (TFT) formed thereon and an opposed substrate with a color filter or the like formed thereon, and the liquid crystal particles are controlled by means of an electric field to thereby form an image. The interval between the TFT substrate and the opposed substrate is very small, such as of the order of a few microns. Conventionally, the interval between the TFT substrate and the opposed substrate is determined by dispersing plastic beads and the like. According to this interval setting by dispersing beads, however, the beads may not be dispersed consistently, and in such a case the interval between the TFT substrate and the opposed substrate may not be set as predetermined. In addition, the beads may be dispersed on a pixel electrode, which may cause a problem of light leakage in the vicinity of the beads.

Meanwhile, conventionally, in order to fill liquid crystal, the space between the TFT substrate and the opposed substrate is sealed to be vacant, and liquid crystal is injected into the space by utilizing atmospheric pressure. This method, however, takes time to complete injection of liquid crystal when the interval between the TFT substrate and the opposed substrate is small and the surface of the liquid crystal display is large. As a result, manufacturing throughput is reduced, and manufacturing cost resultantly increases. In order to address the above, there has been developed a technique, e.g., for applying, by dropping, the required amount of liquid crystal onto a TFT substrate and thereafter forming an opposed substrate to seal the liquid crystal in-between.

As described above, conventionally, the interval between the TFT substrate and the opposed substrate is maintained by small beads dispersed therein. However, according to the above described liquid crystal dropping method, the dispersed beads may move as the liquid crystal is dropped, which results in an area with many beads and an area with only a few beads. This results in an inconsistent interval between the TFT substrate and the opposed substrate, and an inconsistent interval between the TFT substrate and the opposed substrate in turn results in a problem of reduced image contrast and/or inconsistent pixels in a liquid crystal display device.

In order to address the above described problem with a case in which the interval between a TFT substrate and an opposed substrate is set utilizing beads, there is available a technique for defining the interval between the TFT substrate and the opposed substrate by forming a column on either the TFT substrate or the opposed substrate, as disclosed in Japanese Patent Laid-open Publication No. Hei 11-84386.

The column for defining the interval between the TFT substrate and the opposed substrate is conventionally formed on the opposed substrate. Specifically, in formation of a column on the opposed substrate, the column is formed such that, after the opposed substrate and the TFT substrate are combined to each other, the column abuts on a predetermined position on the TFT substrate. However, should the opposed substrate and the TFT substrate be displaced from each other when being combined to each other, a column resultantly abuts outside the predetermined position on the TFT substrate. This may result in a column formed on a pixel electrode or a column falling on a through-hole formed on a line of the TFT substrate. A column formed on a pixel electrode results in light leakage due to orientation disturbance in the portion where such a column is formed. A column falling on a through-hole results in an interval not appropriately defined between the TFT substrate and the opposed substrate.

Japanese Patent Laid-open Publication No. Hei 11-84386 discloses a structure in which a column is formed on either the opposed substrate or the TFT substrate in a position on a capacitance line in order to address orientation disturbance which would be caused in the vicinity of the column, and moreover, the capacitance line is laid extending in the rubbing direction of the alignment film. However, the capacitance line, which is essential in the above described structure disclosed in Japanese Patent Laid-open Publication No. Hei 11-84386, reduces transmittance of the liquid crystal display device. In particular, the capacitance line extending in the rubbing direction of the alignment film, as described in Japanese Patent Laid-open Publication No. Hei 11-84386, further reduces the transmittance.

SUMMARY OF THE INVENTION

An object of the present invention is to realize a liquid crystal display device having a structure in which the interval between the TFT substrate and the opposed substrate is defined by a column and oriental disturbance and transmittance reduction due to formation of the column are suppressed.

In order to attain the above described object, according to one aspect of the present invention, a column for defining the interval between the TFT substrate and the opposed substrate is formed on the TFT substrate at a crossing point between a drain electrode and a scanning line. This column is formed at a crossing point between a scanning line and a drain line corresponding to a pixel of a specific color. Further, at a crossing point between a scanning line and a drain line corresponding to a pixel of a specific color, the width of the drain line is formed wider than that in other positions, while the width of the corresponding scanning line is formed narrower than that in other positions.

According to another aspect of the present invention, at a crossing point between a scanning line and a drain line corresponding to a pixel of a specific color, the width of the scanning line is formed wider than that in other positions, while the width of the corresponding drain line is formed narrower than that in other positions. Specifically, the following arrangement is employed.

(1) According to one aspect of the present invention, there is provided a liquid crystal display device having scanning lines extending in a lateral direction and aligned in a longitudinal direction, drain lines extending in the longitudinal direction and aligned in the lateral direction, a TFT substrate having pixels each having a TFT and a pixel electrode and formed in an area enclosed by the drain line and the scanning line, the pixels constituting a first pixel, a second pixel, and a third pixel, respectively, depending on a color to which the respective pixel corresponds, and being aligned in the lateral direction, an opposed substrate placed with a predetermined interval with respect to the TFT substrate, and liquid crystal enclosed between the TFT substrate and the opposed substrate, wherein a column for defining the interval between the TFT substrate and the opposed substrate is formed at a crossing point between the drain line and the scanning line corresponding to the first pixel, and a width of the drain line is wider at the crossing point where the column is formed than that of the drain line in another position.

(2) In the above described liquid crystal display, at a point where the width of the drain line is wider, a width of the scanning line may be narrower than that of the scanning line in another position.

(3) In the above described liquid crystal display, a first TFT may be formed at the crossing point between the drain line and the scanning line, where the column is formed, a second TFT may be formed at a position adjacent to the crossing point between the drain line and the scanning line, where the column is formed, the first TFT and the second TFT may be electrically connected to each other, and a channel length of the first TFT may be shorter than that of the second TFT.

(4) In the above described liquid crystal display, a channel length of a TFT formed at a crossing point between the drain line and the scanning line corresponding to the first pixel may be shorter than that of a TFT formed at a crossing point between the drain line and the scanning line corresponding to the second pixel or the third pixel.

(5) In the above described liquid crystal display, the liquid crystal display device may be of an IPS method.

(6) According to another aspect of the present invention there is provided a liquid crystal display device having scanning lines extending in a lateral direction and aligned in a longitudinal direction, drain lines extending in the longitudinal direction and aligned in the lateral direction, a TFT substrate having pixels each having a TFT and a pixel electrode and formed in an area enclosed by the drain line and the scanning line, the pixels constituting a first pixel, a second pixel, and a third pixel, respectively, depending on a color to which the respective pixel corresponds, and being aligned in the lateral direction, an opposed substrate placed with a predetermined interval with respect to the TFT substrate, and liquid crystal enclosed between the TFT substrate and the opposed substrate, wherein a column for defining the interval between the TFT substrate and the opposed substrate is formed at a crossing point between the drain line and the scanning line corresponding to the first pixel, and a width of the scanning line is wider at the crossing point where the column is formed than that of the scanning line in another position.

(7) In the above described liquid crystal display device, at a point where the width of the scanning line is wider, a width of the drain line may be narrower than that of the drain line in another position.

(8) In the above described liquid crystal display device, a first TFT may be formed at the crossing point between the drain line and the scanning line, where the column is formed, a second TFT may be formed at a position adjacent to the crossing point between the drain line and the scanning line, where the column is formed, the first TFT and the second TFT may be electrically connected to each other, and a channel length of the first TFT may be longer than that of the second TFT.

(9) In the above described liquid crystal display device, a channel length of a TFT formed at a crossing point between the drain line and the scanning line corresponding to the first pixel may be longer than that of a TFT formed at a crossing point between the drain line and the scanning line corresponding to the second pixel or the third pixel.

(10) In the above described liquid crystal display device, the liquid crystal display device may be of an IPS method.

According to the present invention, as a column for defining the interval between a TFT substrate and an opposed substrate is formed on the TFT substrate side at a crossing point between a scanning line and a drain line, problems due to formation of the column, including reduction of transmittance and light leakage due to orientation disturbance can be reduced. Further, as the width of the drain line is made wider in a position where the column is formed, the problem of light leakage due to orientation disturbance can be further suppressed. Still further, as the width of the scanning line is made narrower in a position where the width of the drain line is wider, increase of parasitic capacitance can be suppressed.

According to the present invention, as the column is formed only at a crossing point between a drain line and a scanning line corresponding to a pixel of a specific color, difference in transmittance or characteristics of TFT's can be compensated for through initial setting, so that color inconsistency due to formation of a column can be prevented.

According to the present invention, as a column is formed at a crossing point between a drain line and a scanning line and the width of the scanning line is made wider in a position where the column is formed than that in other positions, light leakage due to orientation disturbance can be reduced. Further, as the width of the drain line is made narrower in a position where the width of the scanning line is wider, increase of parasitic capacitance can be suppressed.

DETAILED DESCRIPTION OF THE INVENTION

In the following, embodiments of the present invention will be described in detail, based on a structure of an actual liquid crystal cell.

First Embodiment

Figure 1:
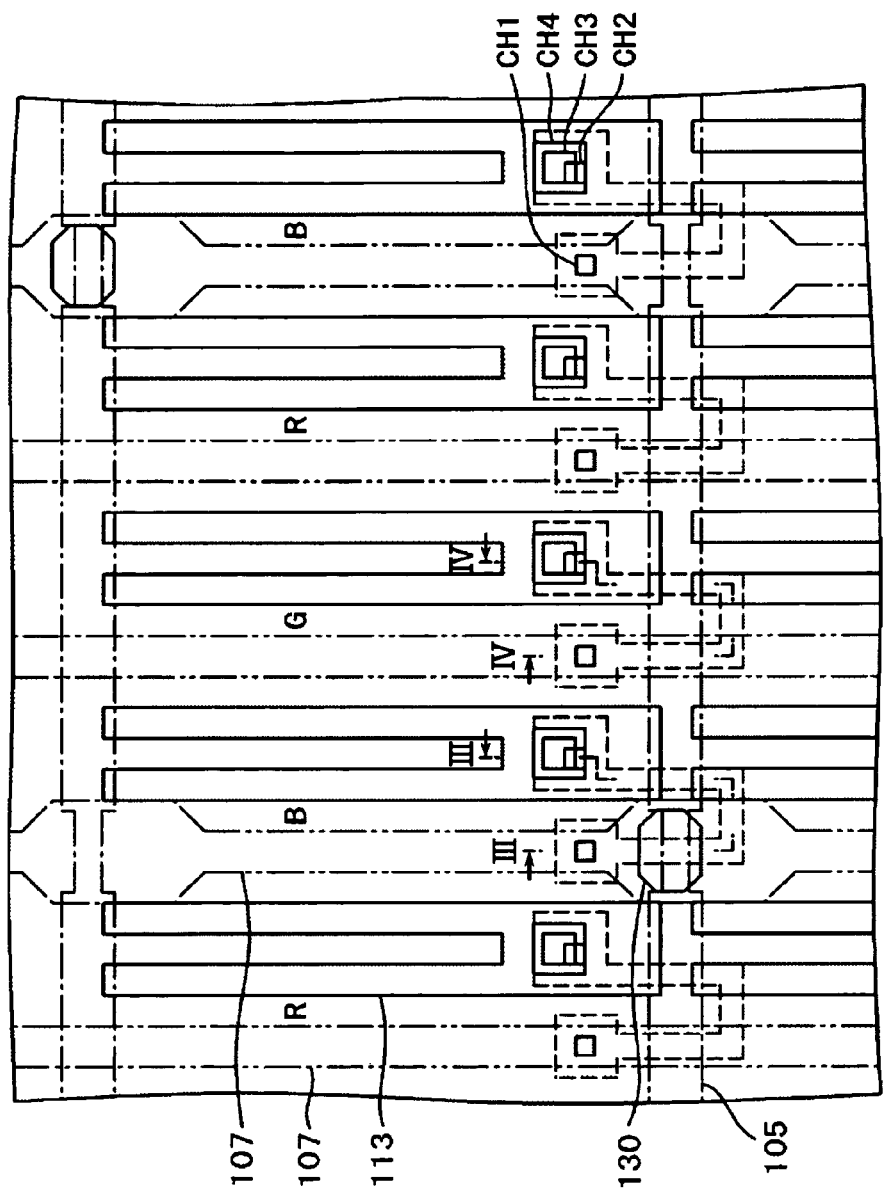
FIG. 1 is a plan view of a TFT substrate according to a first embodiment.
Figure 2:
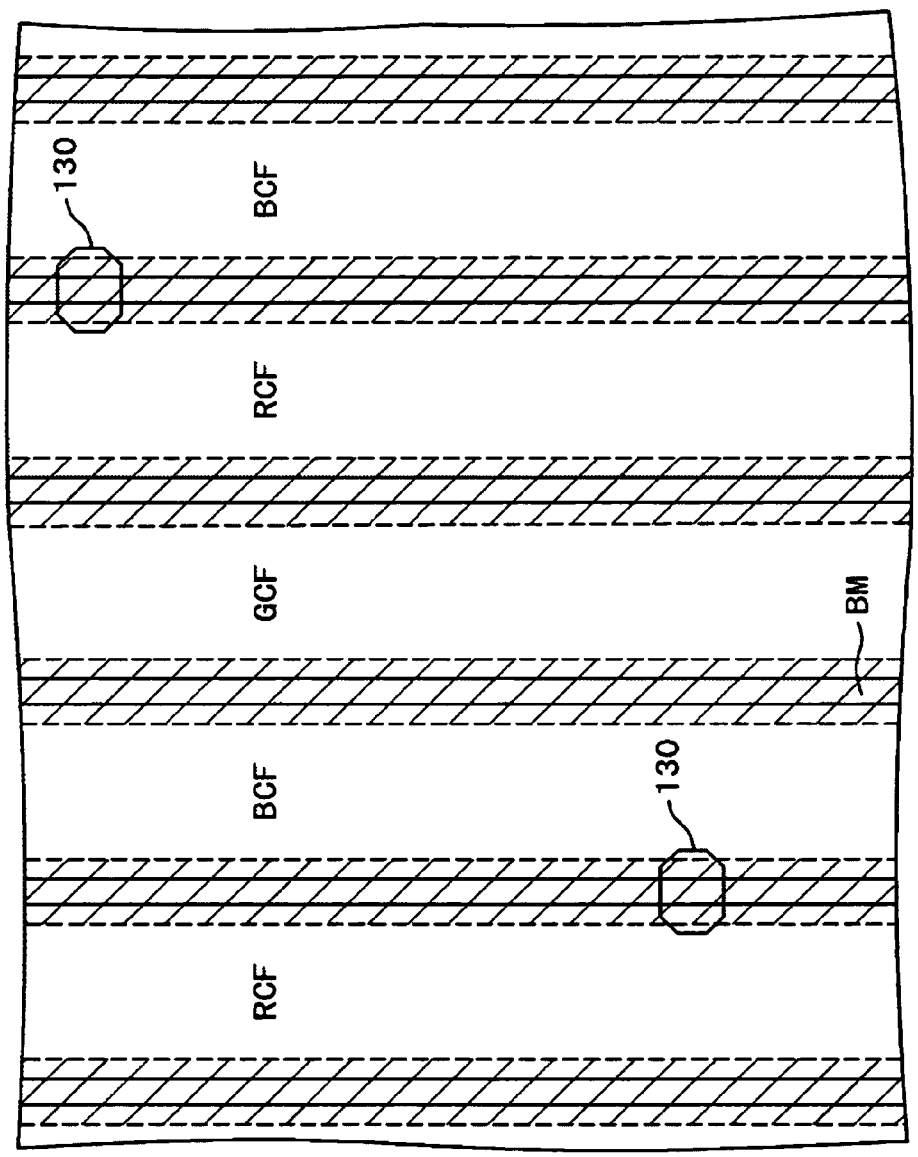
FIG. 2 is a plan view of an opposed substrate according to the first embodiment.
Figure 3:
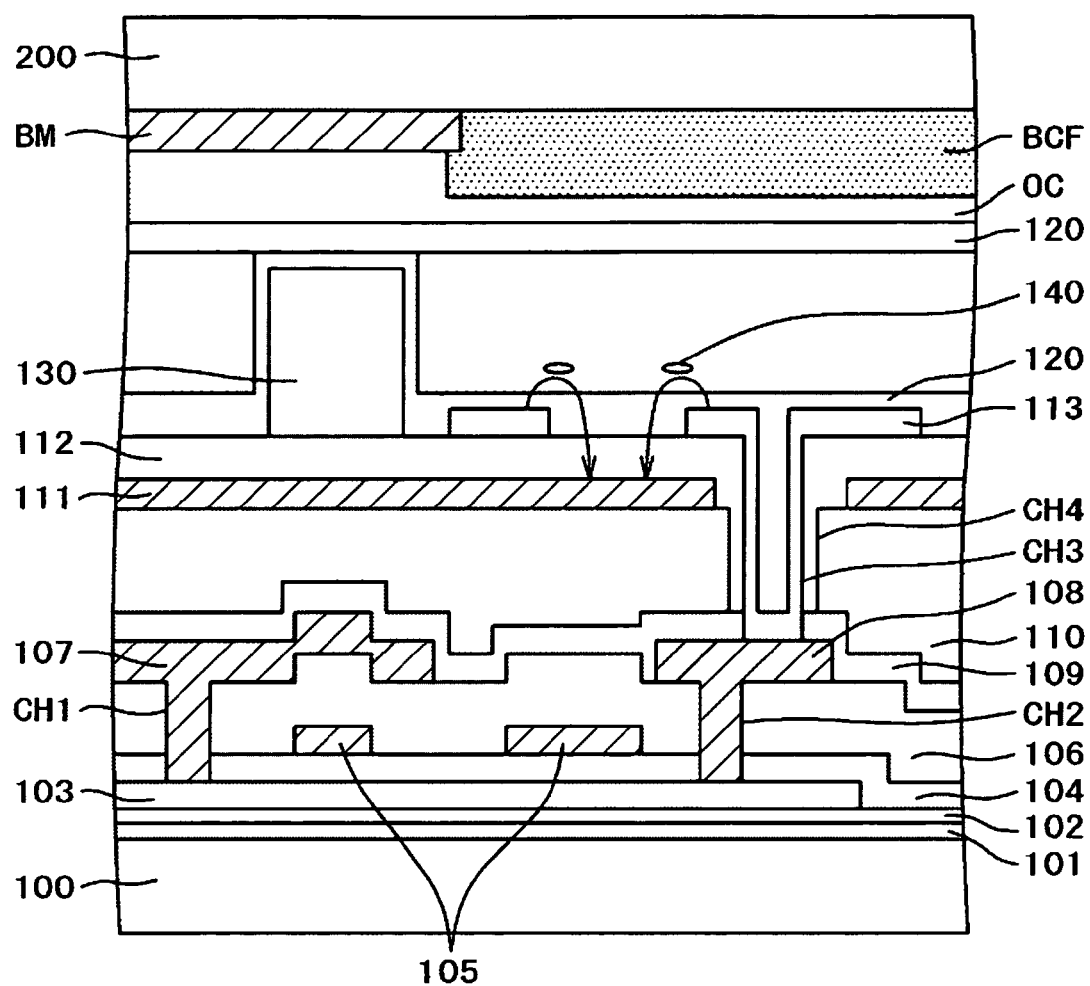
FIG. 3 is a cross sectional view along the line III-III in FIG. 1.
Figure 4:
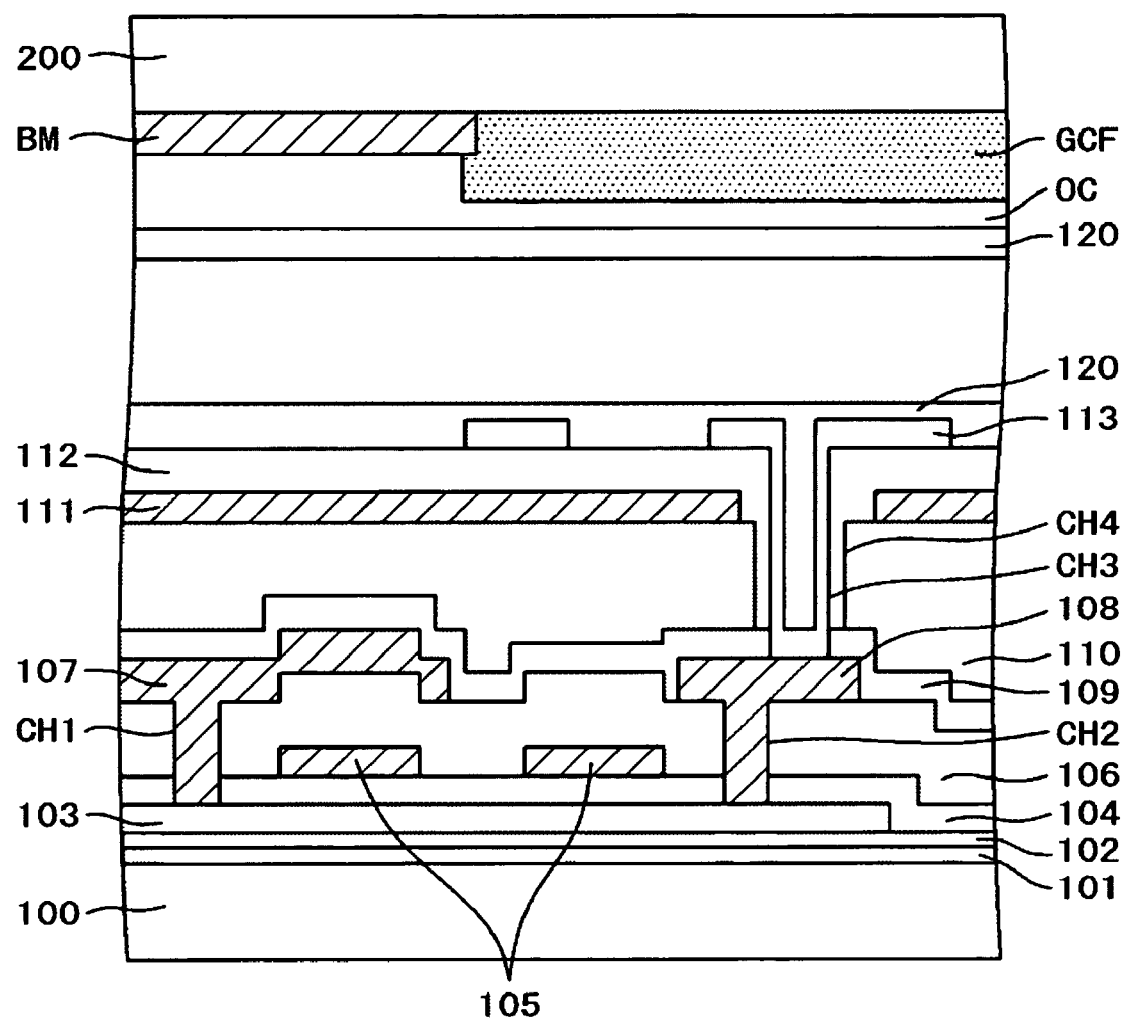
FIG. 4 is a cross sectional view along the line IV-IV in FIG. 1.

FIG. 1 is a plan view showing a pixel portion of a TFT substrate to which the present invention is applied; FIG. 2 is a plan view showing an opposed substrate to be combined with the TFT substrate; FIG. 3 is a cross sectional view along the line III-III shown in FIG. 1; and FIG. 4 is a cross sectional view along the line IV-IV shown in FIG. 1.

In FIG. 1, scanning lines 105 extend in the lateral direction and are aligned in the longitudinal direction, and drain lines 107 extend in the longitudinal direction and are aligned in the lateral direction. An area enclosed by the scanning line 105 and the drain line 107 constitutes a pixel. In FIG. 1, a blue pixel B, a green pixel G, and a red pixel R are sequentially aligned in the lateral direction. A liquid crystal display device according to this embodiment is of a so-called IPS method, and adjusts the amount of light to pass through the liquid crystal by rotating the liquid crystal particle 140 in a direction parallel to the substrate.

In FIG. 1, a comb-electrode which constitutes a pixel electrode 113 is provided inside a pixel enclosed by the scanning line 105 and the drain line 107, and a plane common electrode 111 (not shown) is provided under the comb-electrode with an insulating film in-between. The common electrode 111 is formed on the entire surface on the substrate except a contact hole formed on a line. In the IPS in this embodiment, the liquid crystal particle 140 is controlled by an electric line of force which is generated between the comb-electrode, or the pixel electrode 113, and the common electrode 111 formed on the entire surface of the substrate.

A constant voltage is supplied to the common electrode 111, while a video signal is supplied to the pixel electrode 113 via the drain line 107. The video signal is supplied by a TFT. In FIG. 1, the portion indicated by the dot line constitutes a semiconductor layer 103. The semiconductor layer 103 is formed using poly-Si. A gate line lies under the semiconductor layer 103 with a gate insulating film 104 in-between, so that the gate line functions as the gate electrode of the TFT. In FIG. 1, the semiconductor layer 103 is formed in an inverted-C shape, and the gate electrode lies under the semiconductor layer 103 at two points. As the semiconductor layer 103 above the gate electrode constitutes the channel of the TFT, resultantly, two TFT's are formed in series in each pixel in the structure shown in FIG. 1.

The semiconductor layer 103 is connected to the drain line 107 under the drain electrode via a first contact hole CH1. That is, in this embodiment, the drain line 107 functions also as the drain electrode of the TFT. The other end of the semiconductor layer 103 is electrically-conductively connected to the pixel electrode 113 via a second contact hole CH2, a third contact hole CH3, and a fourth contact hole CH4. Therefore, a video signal from the drain line 107 is supplied to the pixel electrode 113 via the TFT.

This embodiment is characterized in that a column 130 for defining the interval between a TFT substrate 100 and an opposed substrate 200 is formed at a position where the scanning line 105 intersects the drain line 107. The plane shape of the column 130 is of an octagon long in the lateral direction, as shown in FIG. 1. In this embodiment, as the column 130 is formed on the TFT substrate 100, a problem due to displacement in position of the column 130 when combining the TFT substrate 100 and the opposed substrate 200 may be less serious, compared to a case in which the column 130 is formed on the opposed substrate 200.

In this embodiment, as the column 130 is formed at a crossing point between the scanning line 105 and the drain line 107, deterioration in transmittance can be suppressed. This is because the crossing point between the scanning line 105 and the drain line 107 originally does not pass light through, and is not utilized in image formation due to a TFT present in the vicinity of the crossing point.

However, as formation of the column 130 may disturb orientation of the liquid crystal in the vicinity of the column 130, in order to prevent this influence, in this embodiment, the width of the drain line 107 is made wider in the vicinity of the crossing point with the scanning line 105. Specifically, in this embodiment, the width of the drain line 107 at the crossing point is double or larger the width of the drain line 107 in other positions. Even this arrangement exerts only little influence in terms of reduction of transmittance as the crossing point between the scanning line 105 and the drain line 107 originally does not contribute to image formation.

As the width of the drain line 107 is wider at the crossing point, the scanning line 105 overlaps the drain line 107 at the crossing point in an increased area. This means increase of parasitic capacitance, which brings, e.g., a phenomenon such as increase of a shift voltage or the like when the concerned TFT shifts from ON to OFF or vice versa. In this embodiment, in order to suppress increase of parasitic capacitance in the vicinity of the crossing point, the width of the scanning line 105 in the vicinity of the crossing point is made narrower.

In FIG. 1, a red pixel R, a blue pixel B, and a green pixel G are aligned in the lateral direction. As shown in FIG. 1, the column 130 is formed only at a crossing point between the scanning line 105 and the drain line 107 corresponding to the blue pixel B. In other words, the column 130 is formed at a crossing point where a TFT for controlling the blue pixel B is formed. As the width of the drain line 107 is wider in a position where the column 130 is formed, the transmittance in the position may be slightly reduced compared to that in a position without the column 130 and the characteristic of the concerned TFT may become different from that of other TFT's.

Here, if the column 130 is formed spreading to pixels of three colors, control for color inconsistency or the like is difficult to be properly achieved. In this embodiment, however, as the column 130 is formed only at a crossing point corresponding to the blue pixel B, influence on color inconsistency due to formation of the column 130 is prevented. In this case, transmittance of the blue pixel B alone may become smaller than that of the pixels of other colors, and the characteristic of a TFT which controls the blue pixel B may become different from that of a pixel of another color. This, however, can be addressed through initial setting for compensation of the characteristic.

In FIG. 1, a crossing point between the scanning line 105 and the drain line 107 corresponding to the blue pixel B appears every three pixel pitch in the lateral direction, and the width of the drain line 107 is wider at all crossing points corresponding to the blue pixel B than that in other positions. Meanwhile, it is unnecessary to form a column 130 at all crossing points corresponding to the blue pixel B. This is because presence of only the number of columns 130 necessary to ensure the interval between the TFT substrate 100 and the opposed substrate 200 is sufficient. In this embodiment, irrespective of the presence or absence of the column 130, the width of the drain line 107 is made wider at all crossing points between the scanning line 105 and the drain line 107 corresponding to the blue pixels B to thereby maintain regularity to make it easier to compensate for color inconsistency or the like through initial setting.

In FIG. 1, a semiconductor is formed in an inverted C shape, and a gate line lies under the semiconductor with the gate insulating film 104 in-between. A portion of the semiconductor which intersects the gate line constitutes the channel portion of a TFT. Therefore, there are two TFTs in each pixel, namely, a TFT having a channel portion on the drain line 107 and a TFT having a channel in a portion away from the drain line 107.

In FIG. 1, the channel length of a TFT formed on the drain line 107 corresponding to the blue pixel B is shorter than that of a TFT formed on the drain line 107 corresponding to the red pixel R or green pixel G. Therefore, the characteristic of a TFT of the blue pixel B resultantly differs from that of TFT's of other pixels. As described above, an arrangement in which the characteristic of a TFT related to the blue pixel B alone differs from that of TFT related to other pixels makes it possible to compensate for the characteristic through initial setting.

FIG. 2 is a plan view of the opposed substrate 200 corresponding to the TFT substrate shown in FIG. 1, viewed from the TFT substrate side. In FIG. 2, "RCF" refers to a red filter; "BCF" refers to a blue filter; and "GCF" refers to a green filter. The respective filters corresponding to a red pixel R, a blue pixel B, and a green pixel G. The filter extends in stripe in the longitudinal direction of the screen. Therefore, pixels in the longitudinal direction on the opposed substrate 200 are not discriminated from one another.

A light shielding film BM is formed between filters of respective colors. The light shielding film BM, which is formed on the opposed substrate 200 before forming the color filter, is indicated by the dot line in FIG. 2. The light shielding film BM absorbs external light to enhance contrast of an image. In FIG. 2, the column 130 formed on the TFT substrate 100 abuts on the light shielding film BM at the boundary between the red filter and the blue filter and on the color filter. As described above, with the column 130 abutting on the light shielding film BM on the opposed substrate 200, reduction in transmittance can be suppressed. The TFT substrate 100 shown in FIG. 1 and the opposed substrate 200 shown in FIG. 2 are combined to each other and liquid crystal is enclosed between the TFT substrate 100 and the opposed substrate 200, to thereby form a liquid crystal display panel. FIG. 3 is a cross sectional view of the TFT substrate 100 shown in FIG. 1 along the line III-III with the TFT substrate 100 and the opposed substrate 200 combined to each other. In FIG. 3, on the TFT substrate 100, a first base film 101 is formed using SiN, and a second base film 102 is formed thereon, using $SiO_2$. Both of the first base film 101 and the second base film 102 serve to prevent impurities from dispersing from the glass substrate into the TFT region.

In FIG. 3, a poly-Si layer is formed as the semiconductor layer 103 on the second base film 102. The poly-Si layer is formed by initially forming a-Si by means of CVD, and then transforming the a-Si into poly-Si by means of laser annealing. A gate insulating film 104 is formed using $SiO_2$, covering the semiconductor layer 103.

A MoW film, which constitutes a gate line, is formed, coating the gate insulating film 104. Al alloy is used when reduction of resistance of the gate line is required. Either the gate electrode or the scanning line 105 is patterned at a photo step. In this embodiment, the scanning line 105 also functions as the gate electrode, as shown in FIG. 1. The semiconductor layer 103 below the gate electrode constitutes the channel portion of a TFT. In FIG. 3, two gate electrodes are formed. Therefore, two TFTs are formed in FIG. 3.

A gate electrode having a narrower width corresponds to a TFT formed on the drain line 107, shown in FIG. 1, and a gate electrode having a wider width corresponds to a TFT formed apart from the drain line 107. As shown in FIG. 3, in this embodiment, the channel length of a TFT formed on the drain line 107 is shorter than that of other TFTs. This is because the width of the scanning line 105 is narrower at a crossing point corresponding to the blue pixel B than that in other positions. In this embodiment, the width of the scanning line 105 at the crossing point is a half or narrower than that of the scanning line 105 in other positions.

An inter-layer insulating film 106 is formed using $SiO_2$, covering the gate electrode. The inter-layer insulating film 106 insulates the drain line 107 or source electrode 108 from the scanning line 105. Either the drain line 107 or the source line 108 is formed on the inter-layer insulating film 106. The drain line 107 and the source electrode 108 are formed simultaneously in the same process. In this embodiment, the drain line 107 serves also as the drain electrode of the TFT.

A contact hole is formed on the inter-layer insulating film 106 and the gate insulating film 104 to connect the drain line 107 or the source line 108 and the semiconductor layer 103. In FIG. 3, the drain line 107 and the semiconductor layer 103 are connected through the first contact hole CH1, and the source electrode 108 and the semiconductor layer 103 are connected through the second contact hole CH2. An inorganic passivation film 109 is formed, using SiN, covering the drain line 107 and the source electrode 108 to protect the TFT.

An organic passivation film 110 is formed on the passivation film. The organic passivation film 110 covers a portion of the TFT, which cannot be covered due to a pin hole or the like formed in the inorganic passivation film 109 to protect the TFT, and also serves as a planarization film. Therefore, the organic passivation film 110 is formed as thick as 1 to 3 μm.

After formation of the organic passivation film 110, a third contact hole CH3 and a fourth contact hole CH4 hole for connecting the pixel electrode 113, to be formed later, and the source electrode 108 of the TFT are formed. The organic passivation film 110 is formed using a photosensitive resin, and can be patterned without use of photo-resist. Initially, the fourth contact hole CH4 is formed on the organic passivation film 110, and the third contact hole CH3 is thereafter formed on the inorganic passivation film 109, using the organic passivation film 110 as a resist.

Thereafter, the common electrode 111 is formed, using ITO, or a transparent conductive film, on the planarized organic passivation film 110. The common electrode 111 is formed on the entire surface of the organic passivation film 110 by means of sputtering or the like, and remains plane except in the vicinity of the contact hole after the patterning.

A pixel insulating film 112 is formed using SiN, covering the common electrode 111. A contact hole for electrically-conductively connecting the source electrode 108 of the TFT and the pixel electrode 113 is formed on the pixel insulating film 112. Thereafter, the pixel electrode 113 is formed using ITO, or a transparent conductive film, on the pixel insulating film 112. The pixel electrode 113 is formed by spattering ITO onto the entire surface of the pixel insulating film 112, and then patterning the ITO into a comb-electrode, as shown in FIG. 1.

FIG. 3 shows a cross section of the comb-electrode. With a voltage applied to the pixel electrode 113, an electric line of force is generated between the pixel electrode 113 and the plane common electrode 111, as shown in FIG. 3, which causes the liquid crystal particle 140 to rotate, following the electric line of force. According to the IPS (In Plane Switching) method, transmission of light from the backlight is controlled by rotating the liquid crystal particle 140 to thereby form an image.

A column 130 is formed, using resin, on the pixel insulating film 112 in a position corresponding to a crossing point between the scanning line 105 and the drain line 107. The column 130 is formed by coating the pixel insulating film 112 and the pixel electrode 113 with resign and then removing unnecessary resin at photo step. Acrylic resin is used as resin. The height of the column 130 corresponds to the interval between the TFT substrate 100 and the opposed substrate 200, being a few μm.

An alignment film 120 is formed using organic material, covering the pixel electrode 113 and the column 130. In order to align the liquid crystal particles with respect to the alignment film 120, rubbing is carried out. Rubbing is a process of rubbing the alignment film 120 in a constant direction, using cloth. However, presence of the column 130 may leave a portion around the column 130 only insufficiently rubbed. This leads to light leakage from the portion.

In this embodiment, however, as the column 130 is formed at a crossing point between the scanning line 105 and the drain line 107 and the drain line 107 has a wider width at the crossing point, reduction of contrast due to light leakage from an insufficiently rubbed portion, if any, around the column 130 is not caused.

In FIG. 3, the opposed substrate 200 is present on the upper side of the TFT substrate 100. A light shielding film BM is initially formed on the opposed substrate 200. The Light shielding film BM fills up the space between the color filters to thereby enhance image contrast. In this embodiment, a light shielding film BM is formed also on the opposed substrate 200 in a position corresponding to where the column 130 is formed, so that light leakage around the column 130 is prevented by the light shielding film MB as well.

After formation of the light shielding film BM, color filters corresponding to the respective pixel colors are formed. In FIG. 3, a blue filter is formed. The surface resulted after formation of the color filter is convexo-concave, and therefore an overcoat film OC is formed on the color filter for planarization. Then, an alignment film 120 is formed, followed by rubbing to align the liquid crystal particles.

FIG. 3 shows a state in which the TFT substrate 100 and the opposed substrate 200, both formed as described above, are combined opposed to each other with the column 130 in-between, and liquid crystal is enclosed between the TFT substrate 100 and the opposed substrate 200. The interval between the TFT substrate 100 and the opposed substrate 200 is defined according to the height of the column 130.

FIG. 4 shows a cross section along the line IV-IV in FIG. 1, of the TFT substrate and the opposed substrate 200 combined to each other. FIG. 4 is a cross sectional view corresponding to the green pixel G. In FIG. 4, a structure of the TFT substrate 100 is similar to that described with reference to FIG. 3 except that the width of the gate electrode of a TFT formed at a crossing point between the scanning line 105 and the drain line 107 is identical to that of a TFT formed away from the crossing point in FIG. 4. This is because, in FIG. 4, the width of the scanning line 105 which constitutes the gate electrode is constant. Therefore, the channel lengths of the two TFT's are identical and longer than that of a TFT formed at a crossing point where the column 130 is formed, shown in FIG. 3.

In FIG. 4, a structure of the opposed substrate 200 is identical to that which is described with reference to FIG. 3, except that the color filter is a green filter. In addition, no column 130 is formed in FIG. 4 because a column 130 is formed only at a crossing point between the scanning line 105 and the drain line 107 corresponding to the blue pixel B in this embodiment.

As described above, according to this embodiment, as the column 130 is formed at a crossing point between the scanning line 105 and the drain line 107, light leakage due to orientation disturbance can be prevented. Also, according to this embodiment, the drain line 107 with the column 130 formed thereon has a wider width at a crossing point with the scanning line 105 than that in other positions, risk of light leakage can be further reduced. Also, according to this embodiment, increase of capacitance between the gate and the drain can be reduced in an area where the width of the drain line 107 is wider, by reducing the width of the scanning line 105.

In this embodiment, as the column 130 is formed at a crossing point between the scanning line 105 and the drain line 107 corresponding to the same color, a problem of color inconsistency or the like can be avoided by compensating for a difference in light transmittance between a portion with the column 130 formed thereon and a portion without a column 130, a difference in characteristic between transistors, and so forth through initial setting.

Second Embodiment

Figure 5:
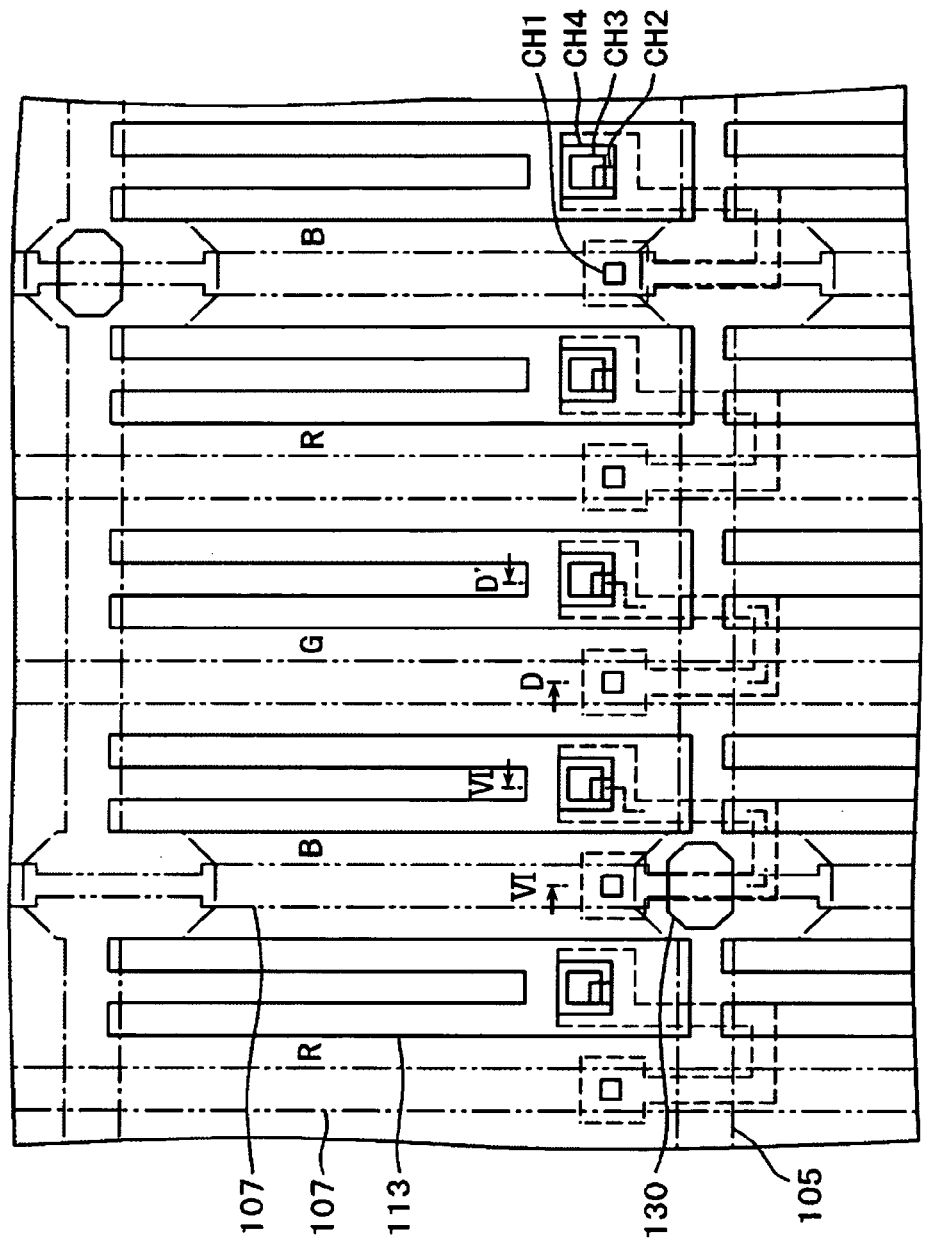
FIG. 5 is a plan view of a TFT substrate according to a second embodiment.
Figure 6:
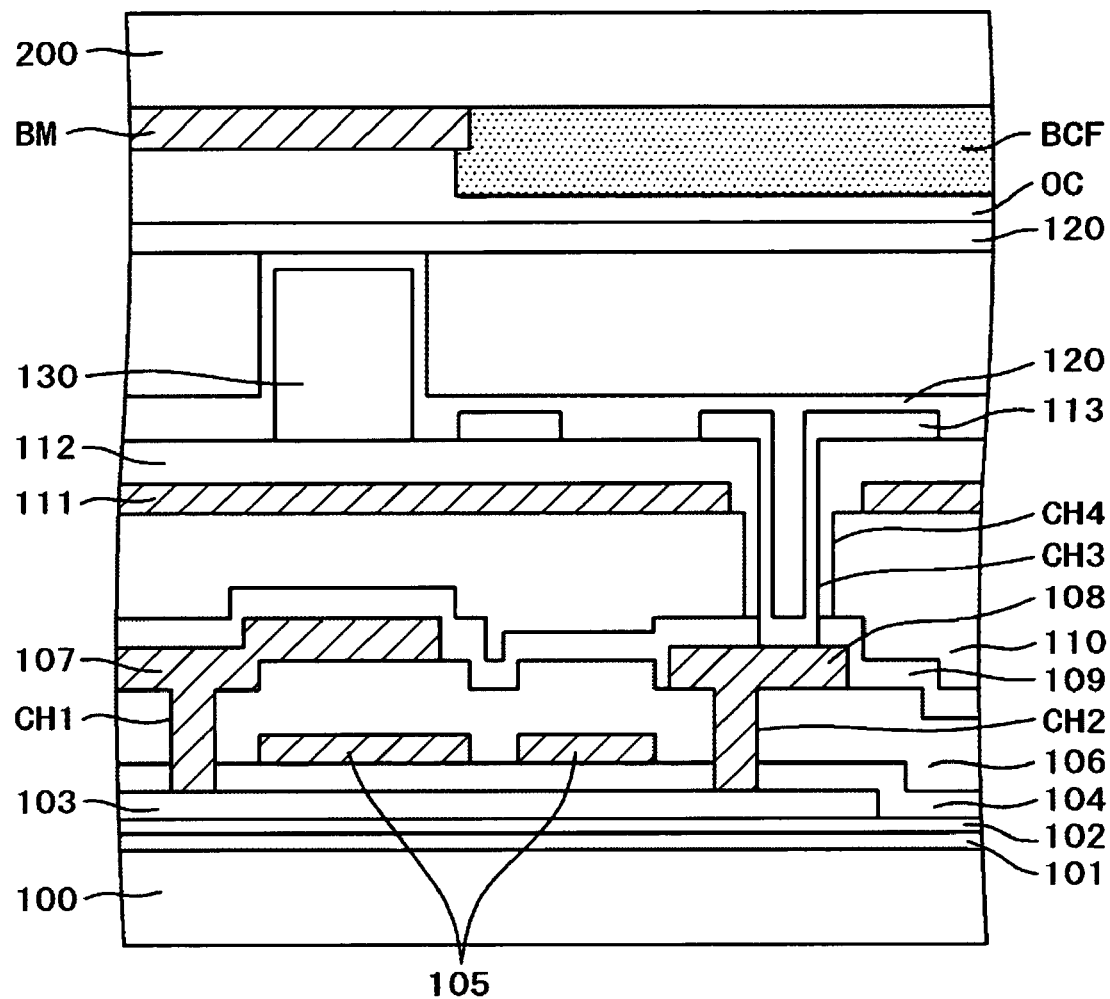
FIG. 6 is a cross sectional view along the line VI-VI in FIG. 5.

FIG. 5 is a plan view showing a second embodiment of the present invention; and FIG. 6 is a cross sectional view along the line VI-VI in FIG. 5. In FIG. 5, a structure in the second embodiment is similar to that of the first embodiment shown in FIG. 1 except a portion where the scanning line 105 intersects the drain line 107. In FIG. 5, the scanning lines 105 extend in the lateral direction and are aligned in the longitudinal direction, and the drain lines 107 extend in the longitudinal direction and are aligned in the lateral direction. A column 130 is formed at a crossing point between the scanning line 105 and the drain line 107, similar to the first embodiment.

In FIG. 5, a column 130 is formed at a crossing point between the scanning line 105 and the drain line 107 corresponding to the blue pixel B. In FIG. 5, in order to address light leakage due to insufficient rubbing around the column 130, the scanning line 105 is formed to have a wider width at the crossing point than that in other positions. Accordingly, in order to prevent increase of parasitic capacitance of the gate electrode and the drain electrode, the drain electrode is formed to have a narrower width than that in other positions.

The gate line has a wider width at a crossing point between the scanning line 105 and the drain line 107 corresponding to the blue pixel B, irrespective of the presence or absence of a column 130. Note that "a crossing point between the scanning line 105 and the drain line 107 corresponding to the blue pixel B" refers to a crossing point where a TFT which controls the blue pixel B is formed.

Also in FIG. 5, two TFT's are formed at a crossing point between the scanning line 105 and the drain line 107 and in the vicinity thereof. In FIG. 5, because the width of the gate electrode is wider in a position where the column 130 is formed, that is, at a crossing point between the scanning line 105 and the drain line 107 corresponding to the blue pixel B, the channel length of a TFT formed therein is longer than that of the other TFT's. Meanwhile, the gate electrode widths of two TFT's at a crossing point between the scanning line 105 and the drain line 107 corresponding to a pixel of other colors and in the vicinity thereof are identical, and thus these TFT's have identical channel length.

A structure of the opposed substrate 200 corresponding to the TFT substrate 100 shown in FIG. 5 is identical to that shown in FIG. 2. That is, according to this embodiment, as the column 130 is formed at a crossing point between the scanning line 105 and the drain line 107, similar to the first embodiment, a structure of the opposed substrate 200 is identical to that in the first embodiment.

The TFT substrate 100 shown in FIG. 5 and an opposed substrate 200 similar to that which is shown in FIG. 2 are combined to each other, and liquid crystal is enclosed between the TFT substrate 100 and the opposed substrate 200, to thereby form a liquid crystal display panel. FIG. 6 is a cross sectional view of the TFT substrate shown in FIG. 5 along the line VI-VI with the TFT substrate and the opposed substrate 200 combined to each other.

In FIG. 6, a process until formation of the gate insulating film 104 and coating of a MoW film to be a gate line is identical to that shown in FIG. 3 in the first embodiment. In FIG. 6, a MoW film, which constitutes either the gate electrode or the scanning line 105, is formed, coating the gate insulating film 104. Thereafter, either the scanning line 105 or the gate electrode is patterned at a photo step. Also in this embodiment, the scanning line 105 functions also as the gate electrode.

As shown in FIG. 5, as the scanning line 105, which constitutes the gate electrode, has a wider width at a crossing point between the scanning line 105 and the drain line 107, the gate electrode at the crossing point is longer in FIG. 6, and the channel length of the TFT is accordingly longer. That is, in FIG. 6, the channel length of a TFT formed at a crossing point between the scanning line 105 and the drain line 107 is longer than that of a TFT formed slightly away from the crossing point between the scanning line 105 and the drain line 107.

Thereafter, an inter-layer insulating film 106 is formed. Note that a process thereafter and a structure related to the thereafter process are identical to that which is described with reference to FIG. 3. An opposed substrate 200 is formed on the TFT substrate 100, with a structure of the opposed substrate 200 being identical to that which is described with reference to FIG. 3. As a wider scanning line 105 is formed under the column 130 in this embodiment, light leakage due to orientation disturbance, if occurs, in the vicinity of the column 130 is not caused.

In FIG. 5, no column 130 is formed at a crossing point between the scanning line 105 and the drain line 107 corresponding to a pixel other than the blue pixel B. The cross section along the line D-D' in FIG. 5 is a cross section of the TFT portion corresponding to the red pixel R. This cross sectional view is identical to that in FIG. 4, that is, the cross sectional view along the line IV-IV in FIG. 1 in the first embodiment, with description of the structure not repeated here. Through comparison between the TFT formed at a crossing point between the scanning line 105 and the drain line 107 corresponding to the red pixel R, shown in FIG. 4 and the TFT formed at a crossing point between the scanning line 105 and the drain line 107 corresponding to the blue pixel B, shown in FIG. 6, it is known that the channel length of the TFT related to the blue pixel B is longer.

Meanwhile, through comparison between the TFT formed at a crossing point between the scanning line 105 and the drain line 107 corresponding to the red pixel R, shown in FIG. 4, and the TFT formed at a crossing point between the scanning line 105 and the drain line 107 corresponding to the blue pixel B, shown in FIG. 3, it is known that the channel length of the TFT related to the blue pixel B is shorter. This is a significant difference between the first and second embodiments.

As described above, also in this embodiment, as the column 130 is formed at a crossing point between the scanning line 105 and the drain line 107, light leakage due to orientation disturbance can be avoided. Also, according to this embodiment, a portion of the scanning line 105 at a cross point with the drain line 107, where the column 130 is formed, has a wider width than that in other positions, risk of light leakage can be further reduced. Also, in this embodiment, increase of capacitance between the gate and the drain can be reduced in a portion where the scanning line 105 has a wider width by reducing the width of the drain line 107.

Also in this embodiment, as the column 130 is formed at a crossing point between the scanning line 105 and the drain line 107 corresponding to the same color, a problem of color inconsistency or the like can be avoided by compensating for a difference in light transmittance between a portion with the column 130 formed thereon and a portion without a column 130, a difference in characteristic between transistors, and so forth through initial setting.

Although it is described in the first and second embodiments that the column 130 is formed at a crossing point between the scanning line 105 and the drain line 107 corresponding to the blue pixel B, obviously, the present invention can be similarly applied when the column 130 is formed at a crossing point between the drain line 107 and the scanning line 105 corresponding to either one of the red pixel R or the blue pixel B. Also, although it is described in this embodiment that the IPS has a structure in which the upper comb-electrode is the pixel electrode 113 and the lower plane electrode is the common electrode 111, the present invention can be similarly applied to a structure in which the upper column-electrode is the common electrode 111 and the lower plane electrode is the pixel electrode 113.

Further, although it is described in the above that the liquid crystal display device is of a so-called IPS method, application of the present invention is not limited to the IPS method but the present invention can be similarly applied to a so-called TN method, a VA method, and the like.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   scanning lines;
   drain lines;
   a TFT substrate;
   an opposed substrate placed with a predetermined interval with respect to the TFT substrate; and
   liquid crystal enclosed between the TFT substrate and the opposed substrate; and wherein
   a width of one of the drain lines at a crossing point between the drain line and one of the scanning lines is wider than at other portions of the drain line,
   a width of the one of the scanning lines at the crossing point between the scanning line and the one of the drain lines is narrower than at other portions of the scanning line,
   the TFT substrate includes pixels having TFTs and pixel electrodes, the TFTs including:
   a first TFT formed at the crossing point between the one of the drain lines and the one of the scanning lines, and
   a second TFT formed at a position adjacent to the crossing point between the one of the drain lines and the one of the scanning line, wherein
   the first TFT and the second TFT are electrically connected to each other and electrically connected to the one of the scanning lines, and
   a gate width of the first TFT is narrower than a gate width of the second TFT.

2. The liquid crystal display device according to claim 1, wherein the liquid crystal display device is an In Plane Switching type.

3. A liquid crystal display device comprising:
   scanning lines;
   drain lines;
   a TFT substrate;
   an opposed substrate placed with a predetermined interval with respect to the TFT substrate;
   liquid crystal enclosed between the TFT substrate and the opposed substrate; and wherein
   a width of one of the drain lines at a crossing point between the drain line and one of the scanning lines is narrower than at other portions of the drain line, a width of one of the scanning lines extending through a crossing point between the scanning line and one of the drain lines is wider than at other portions of the scanning line, the TFT substrate includes pixels having TFTs and pixel electrodes, the TFTs including:

a first TFT formed at the crossing point between the one of the drain lines and the one of the scanning lines, and a second TFT formed at a position adjacent to the crossing point between the one of the drain lines and the one of the scanning line, wherein the first TFT and the second TFT are electrically connected to each other and electrically connected to the one of the scanning lines, and a gate width of the first TFT is wider than a gate width of the second TFT.

4. The liquid crystal display device according to claim 3, wherein the liquid crystal display device is an In Plane Switching type.

* * * * *